(12) United States Patent
Yamaguchi et al.

(10) Patent No.: US 10,817,742 B2
(45) Date of Patent: Oct. 27, 2020

(54) PRODUCT INFORMATION GENERATION SYSTEM, PRODUCT INFORMATION GENERATION PROGRAM, AND PRODUCT INFORMATION GENERATION METHOD

(71) Applicant: Mercari, Inc., Tokyo (JP)

(72) Inventors: Takuma Yamaguchi, Tokyo (JP); Kenji Sugiki, Tokyo (JP)

(73) Assignee: Mercari, Inc., Tokyo (JP)

( * ) Notice: Subject to any disclaimer, the term of this patent is extended or adjusted under 35 U.S.C. 154(b) by 65 days.

(21) Appl. No.: 16/156,157

(22) Filed: Oct. 10, 2018

(65) Prior Publication Data

US 2019/0171902 A1 Jun. 6, 2019

(30) Foreign Application Priority Data

Oct. 18, 2017 (JP) ................. 2017-202233

(51) Int. Cl.
*G06K 9/46* (2006.01)
*G06Q 30/08* (2012.01)
(Continued)

(52) U.S. Cl.
CPC ......... *G06K 9/4604* (2013.01); *G06F 16/532* (2019.01); *G06F 16/5866* (2019.01);
(Continued)

(58) Field of Classification Search
CPC .............. G06F 16/532; G06F 16/5866; G06K 9/00671; G06K 9/4604; G06K 9/6215; G06Q 30/08
See application file for complete search history.

(56) References Cited

U.S. PATENT DOCUMENTS

2012/0059718 A1* 3/2012 Ramer ............... G06Q 30/0247
705/14.53
2013/0198030 A1* 8/2013 Linden ............... G06Q 30/0256
705/26.7
(Continued)

FOREIGN PATENT DOCUMENTS

JP 2008-268985 A 6/2008

OTHER PUBLICATIONS

Bernardi, R. et al., "Automatic Description Generation from Images: A Survey of Models, Datasets, and Evaluation Measures," 34 pages, Apr. 24, 2017.
(Continued)

*Primary Examiner* — David Bilodeau
(74) *Attorney, Agent, or Firm* — Sterne, Kessler, Goldstein & Fox P.L.L.C.

(57) ABSTRACT

Provided is a product information generation system and the like capable of performing comprehensive determination using information on access to a plurality of pieces of media data from media data representing a product and generating product information. A product information generation system including a storage unit that stores access information used for access to product media data representing a product from a plurality of terminal devices in association with the product media data, a communication unit that receives the product media data transmitted from one terminal device, a feature extraction unit that extracts a feature of the received product media data, a similar media acquisition unit that acquires similar product media data of which a degree of similarity to the received product media data is equal to or higher than a predetermined degree of similarity and the access information associated with the similar product media data from the storage unit on the basis of the extracted feature, and an information generation unit that merges a plurality of pieces of access information of the acquired
(Continued)

similar product media data to generate product information indicating the product of the received product media data.

20 Claims, 10 Drawing Sheets

(51) Int. Cl.
- *G06F 16/532* (2019.01)
- *G06F 16/58* (2019.01)
- *G06K 9/00* (2006.01)
- *G06K 9/62* (2006.01)

(52) U.S. Cl.
CPC ......... *G06K 9/00671* (2013.01); *G06Q 30/08* (2013.01); *G06K 9/6215* (2013.01)

(56) References Cited

U.S. PATENT DOCUMENTS

| | | | |
|---|---|---|---|
| 2015/0019345 A1* | 1/2015 | Masuko | G06K 9/4604 |
| | | | 705/14.66 |
| 2015/0088862 A1* | 3/2015 | Umeda | G06Q 30/0629 |
| | | | 707/722 |
| 2016/0217623 A1* | 7/2016 | Singh | G09G 3/003 |
| 2019/0042079 A1* | 2/2019 | Choi | G06F 16/532 |
| 2019/0156402 A1* | 5/2019 | Greenberger | G06K 9/00671 |

OTHER PUBLICATIONS

Kolář, M. et al., "Technical Report: Image Captioning with Semantically Similar Images," 3 pages, Jun. 12, 2015.

You, Q. et al., "Image Captioning with Semantic Attention," 10 pages, Mar. 12, 2016.

* cited by examiner

PRODUCT INFORMATION GENERATION SYSTEM, PRODUCT INFORMATION GENERATION PROGRAM, AND PRODUCT INFORMATION GENERATION METHOD

BACKGROUND OF THE INVENTION

Field of the Invention

The present invention relates to a product information generation system, a product information generation program, and a product information generation method for performing generation of product information using access information for media data.

Description of Related Art

In recent years, there has been many technologies for identifying contents represented in media data (for example, image data, moving image data, or sound data), that is, an object or an operation represented by the media data using an image recognition technology or a sound recognition technology to automatically generate a descriptive sentence.

In the recognition technology, an object or the like is not directly recognized, but is recognized using a technology for merging (integrating) information incidental to media data similar to input media data and generating a descriptive sentence (for example, Non-Patent Documents 1 to 3).

In addition, Patent Document 1 discloses a tag assignment method for automatically assigning a tag for characterizing moving image data among other pieces of similar moving image data and enabling the moving image data or a web page including the moving image data to be effectively extracted by a search engine. Specifically, in the tag assignment method, sound included in the moving image data is converted into text data, a keyword is extracted from the text data, a degree of importance of the keyword in a predetermined search system is calculated, and the keyword is assigned as a tag of the moving image data when the degree of importance satisfies a predetermined condition. In this tag assignment method, since a tag is assigned to a keyword familiar to a user as described above, there is a likelihood of the moving image data being effectively searched for.

Patent Documents

[Patent Document 1] Japanese Patent Application Laid-Open No. 2008-268985

Non-Patent Documents

[Non-Patent Document 1] "Image Captioning with Semantic Attention", [online], Sep. 19, 2017, [Searched on Sep. 19, 2017], the Internet, <URL: https://arxiv.org/abs/1603.03925>

[Non-Patent Document 2] "Technical Report: Image Captioning with Semantically Simulated Images", [online], Sep. 19, 2017, [Searched on Sep. 19, 2017], the Internet, <URL: https://arxiv.org/abs/1506.03995>

[Non-Patent Document 3] "Automatic Description Generation from Images: A Survey of Models, Datasets, and Evaluation Measures", [online], Sep. 19, 2017, [Searched on Sep. 19, 2017], the Internet, <URL: https://arxiv.org/abs/1601.03896>

SUMMARY OF THE INVENTION

Here, in Internet auction services or the like, there is a need for simplification of an input operation for product description by causing product information represented in the media data to be set automatically by merely uploading media data representing a product (for example, an image obtained by imaging the product or a sound file obtained by recording music) to a service site.

It can be conceived that (1) in the related art disclosed in Patent Document 1, it is possible to convert moving image data from sound to text data using a sound recognition technology to generate product information, and (2) in the related art disclosed in Non-Patent Documents 1 to 3, it is possible to generate product information using product information of similar media data through an image recognition technology.

However, in the related art (1), an advanced sound analysis technology is required to perform accurate text conversion using the sound recognition technology, the product information can be acquired from only the sound of the moving image data, and it is uncertain whether or not the product information is inherently represented in the moving image data. Further, keywords (for example, "horse", "black", "hot spring", or "restaurant") included in the moving image data are extracted, and then, the keywords are ranked according to the number of searches within the keywords. Linkage between the moving image data and the search keyword/the number of searches is weak.

Further, in the prior art (2), if there are a variety of representations or notations of information assigned to media data, setting of product information for new media data may fail. Specifically, in a method of the related art, when the representation of the information assigned to a similar image is inconsistent, for example, when a variety of descriptions such as "animal", "mammal", "horse", "thoroughbred", and "white horse" are given to an image of a horse, it is difficult to merge (integrate) the information unless there is consistency even when the descriptions are correct. Further, in the method of the related art, persons with different backgrounds may not assign correct information and it is difficult to integrate information due to a difficulty in ensuring consistency even when the information is correct.

Therefore, the prior art (1) and (2) is not sufficient for the above needs.

Therefore, an object of the present invention is to provide a product information generation system, a product information generation program, and a product information generation method capable of generating product information of product media data representing a product by merging a plurality of pieces of information on access to similar product media data.

A product information generation system according to the present invention includes a storage unit that stores access information used for access to product media data representing a product from a plurality of terminal devices in association with the product media data; a communication unit that receives the product media data transmitted from one terminal device; a feature extraction unit that extracts a feature of the received product media data; a similar media acquisition unit that acquires similar product media data of which a degree of similarity to the received product media data is equal to or higher than a predetermined degree of similarity and the access information associated with the similar product media data from the storage unit on the basis of the extracted feature; and an information generation unit that merges a plurality of pieces of access information of the acquired similar product media data to generate product information indicating the product of the received product media data.

A product information generation program according to the present invention causes a computer to realize: a storage function of storing access information used for access to product media data representing a product from a plurality of terminal devices in association with the product media data; a communication function of receiving the product media data transmitted from one terminal device; a feature extraction function of extracting a feature of the received product media data; a similar media acquisition function of acquiring similar product media data of which a degree of similarity to the received product media data is equal to or higher than a predetermined degree of similarity and the access information associated with the similar product media data from the storage unit on the basis of the extracted feature; and an information generation function of merging a plurality of pieces of access information of the acquired similar product media data to generate product information indicating the product of the received product media data.

A product information generation method according to the present invention includes the steps of storing, by a computer, access information used for access to product media data representing a product from a plurality of terminal devices in association with the product media data; receiving the product media data transmitted from one terminal device; extracting, by the computer, a feature of the received product media data; acquiring, by the computer, similar product media data of which a degree of similarity to the received product media data is equal to or higher than a predetermined degree of similarity and the access information associated with the similar product media data from the storage unit on the basis of the extracted feature; and merging, by the computer, a plurality of pieces of access information of the acquired similar product media data to generate product information indicating the product of the received product media data.

According to the present invention, when the user only transmits the product media data, it is possible to merge a plurality of pieces of information on access to the similar product media data together to automatically generate information on the product represented in the product media data. Therefore, it is possible to provide a product information generation system, a product information generation program, and a product information generation method capable of generating product information comprehensively determined on the basis of access information of a user.

DETAILED DESCRIPTION OF THE INVENTION

Embodiment 1

Hereinafter, Embodiment 1 of the present invention will be described below with reference to the drawings. In Embodiment 1, product media data such as a product image captured by a terminal device 300 or a recorded sound file is transmitted from the terminal device 300 to an information processing device 200. Processes from a feature extraction process to product information generation are performed in the information processing device 200. The product information generated by the information processing device 200 is transmitted to the terminal device 300 and displayed on the terminal device 300. In the configuration of Embodiment 1, since processes from an information extraction process to an information generation process are performed on the information processing device 200 (server) side, only a small number of functions included in the terminal device 300 (client) are necessary (the configuration can be realized at least with a communication function and a display function as long as product media data downloaded to and recorded in the terminal device 300 in advance is used), which can reduce a processing load on the terminal device 300. Since Embodiment 1 can be realized with only standard functions included in the terminal device 300, it is also possible to simply add the terminal device 300 to the product information generation system.

(System Configuration)

Figure 1:
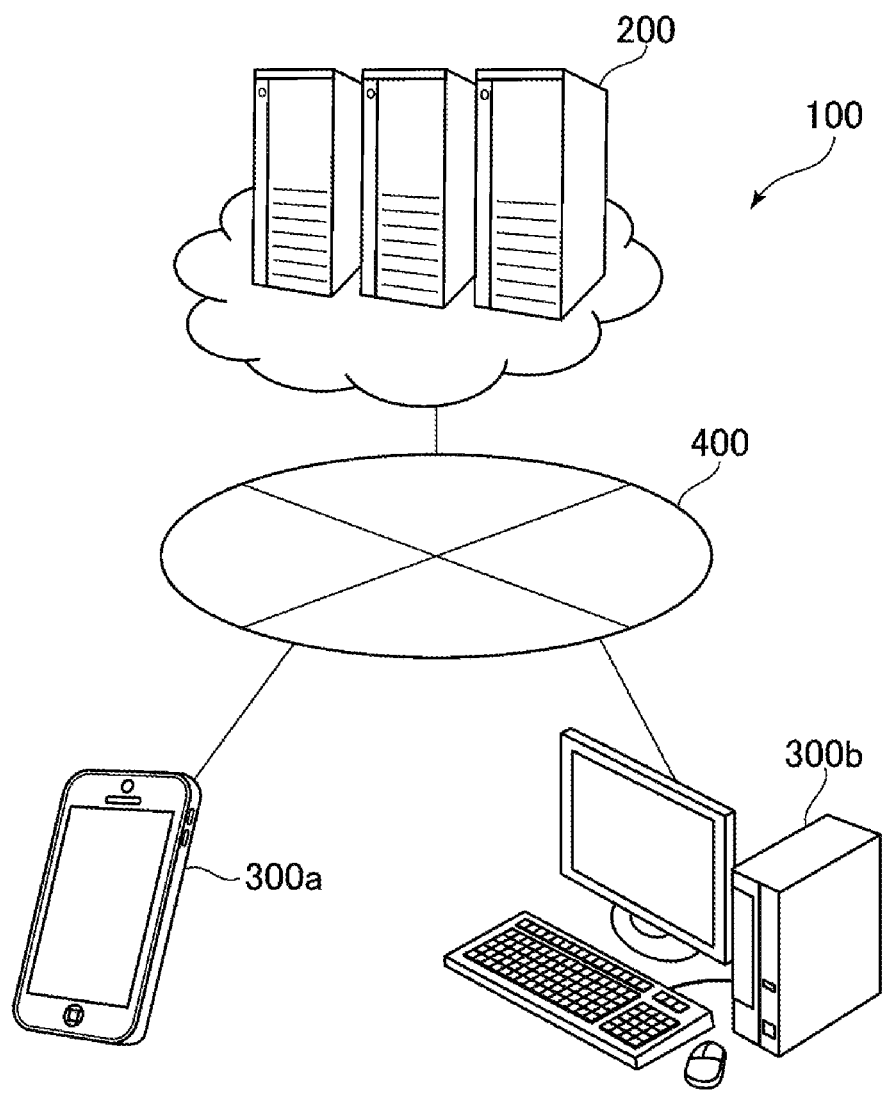
FIG. 1 is a diagram illustrating an example of system configuration of a product information generation system according to Embodiment 1 of the present invention.

FIG. 1 is a system diagram illustrating an example of system configuration of a product information generation system according to Embodiment 1 of the present invention.

As illustrated in FIG. 1, the product information generation system 100 includes the information processing device 200, the terminal device 300, and a network 400 (an IP network or the like).

The information processing device 200 is connected to the terminal device 300 via the network 400. It should be noted that three information processing devices 200 and two terminal devices 300 are shown for simplicity of description in FIG. 1, but it is obvious that there may be fewer or more of these devices.

The information processing device 200 may be any electronic device as long as the electronic device is a computer device having a processing capability for a calculation process and processing such as acquisition, generation, and updating of data. For example, the information processing device 200 may be a personal computer, a server, a mainframe, or any other electronic device.

The information processing device 200 may be, specifically, a processing device that is controlled by a processor as a whole. The processor includes a storage device (storage unit 230) such as a RAM, a ROM and a hard disk drive, an input/output interface, a communication interface (NIC), and the like which are connected via a bus. The storage device has a function of storing various types of processing data or programs necessary for various processes in a control unit 210. Input/output devices such as a display, a keyboard, a mouse, and an external storage medium are connected to the input/output interface. The network 400 is connected to the communication interface.

Further, in the information processing device 200, a software as a service (SaaS), platform as a service (PaaS), or infrastructure as a service (IaaS) of a cloud server may be appropriately used, instead of software, hardware, an OS, or the like (for example, an on-premise type server configuration) dedicated to the product information generation system 100.

The terminal devices 300a and 300b may be any electronic devices such as mobile terminals possessed by a user who uses the product information generation system and may be, for example, any other terminal devices such as mobile terminals, tablet terminals, smartphones, wearable terminals, or personal computers. It should be noted that, hereinafter, the terminal devices 300a and 300b will be collectively referred to as a terminal device 300 when there is no particular need for distinction.

The network 400 is, for example, an IP network. The network 400 may be a wireless network, a wired network, or a combination of the wireless network and the wired network as long as the network is an IP network. For example, in the case of wireless communication, the terminal device 300 may access a wireless LAN access point (not illustrated) and communicate with the information processing device 200 via a LAN or a WAN. Further, the network 400 is not limited to these examples, and may be, for example, a public switched telephone network, Bluetooth (registered trademark), an optical line, an ADSL network, or a satellite communication network.

Figure 3C:
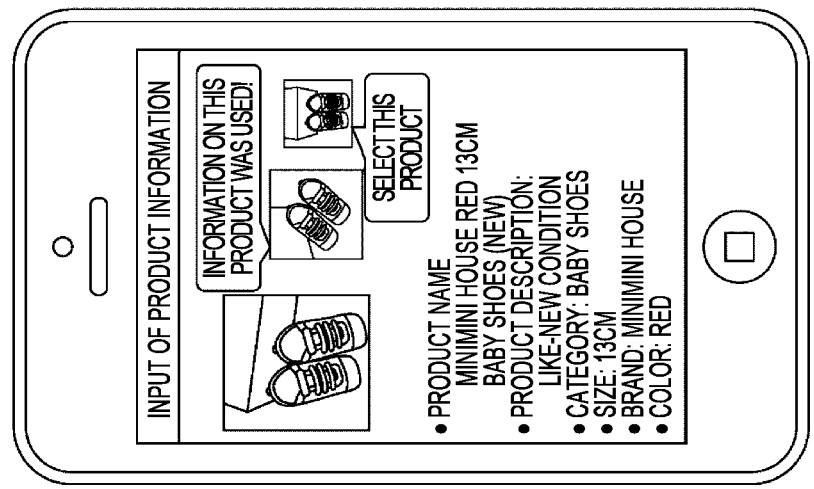
FIGS. 3A-3C are a set of diagrams illustrating an example of a screen displayed on a display unit of a terminal device according to Embodiment 1 of the present invention.
Figure 3B:
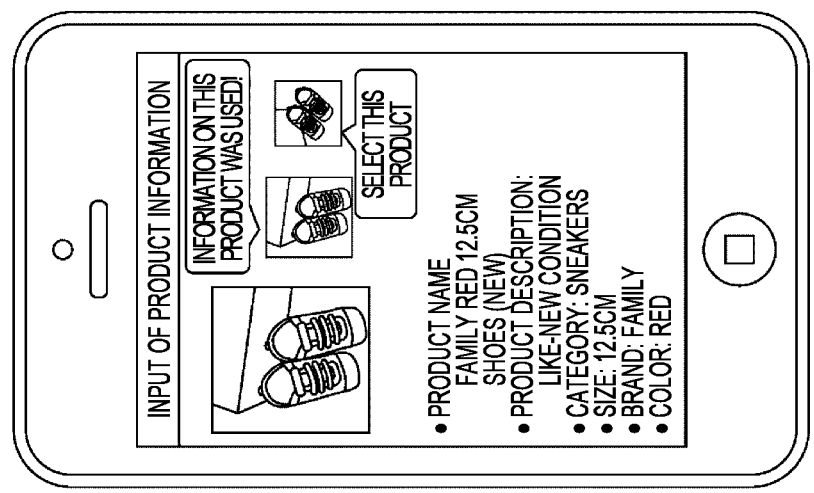
Figure 3A:
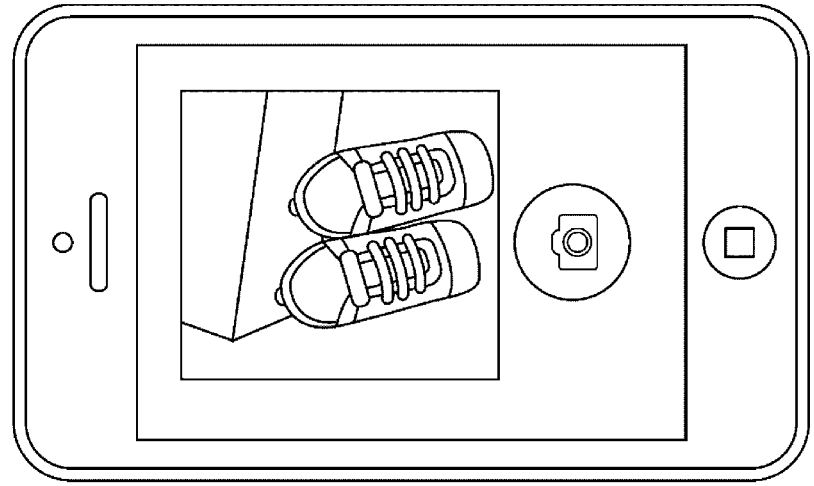

An overview of the product information generation system 100 according to Embodiment 1 of the present invention will be described herein with reference to FIGS. 3A-3C. FIGS. 3A-3C are a set of diagrams illustrating an example of a screen that is displayed on a display unit 341 of the terminal device 300 according to Embodiment 1 of the present invention. In the example of FIGS. 3A-3C, the product information generation system 100 is used for a commercial transaction service such as an Internet auction service.

As illustrated in FIG. 3A, a user who wishes to exhibit a product or the like images the product that is an exhibition target using a camera function of an imaging unit 360 or the like of the terminal device 300 possessed by the user, such as a smartphone, and transmits (uploads) product image data which is product media data representing the imaged product (baby shoes in this example) to an Internet auction service site or application in which the product information generation system 100 is used.

Here, the "product media data" is media data representing a product. Specifically, the product media data refers to, for example, image data, moving image data, sound data, or text data representing a product. Examples of the image data or moving image data representing a product include still image data or moving image data obtained by imaging a product that is an exhibition target in an auction in an Internet auction service, and examples of sound data representing a product include a sound file obtained by recording music of an exhibition target or sound generated by a person or an animal.

When the product information generation system 100 receives the product image data transmitted from the terminal device 300, the product information generation system 100 extracts a feature of the received product image data, searches for similar product image data (similar product media data) of which a degree of similarity to the product image data is equal to or higher than a predetermined degree of similarity on the basis of the extracted feature, and acquires one or more of pieces of similar product image data and access information of the similar product image data. In addition, the product information generation system 100 merges the plurality of pieces of acquired access information of the similar product image data and generates product information of the received product image data. The merging process will be described in the function of the information generation unit 214 to be described below. Here, the "predetermined degree of similarity" may be set to a threshold value for a determination as to whether or not a value is regarded as being similar to a value obtained by quantifying similarity between set element (for example, pixels in the case of an image) of two pieces of media data to be compared. A specific value of the threshold value may be appropriately set to 80%, 90%, or the like according to, for example, the content of a service in which the product information generation system 100 is used.

Here, the "product information" is information representing a product that is a sale or exhibition target. The product information specifically includes a product name, a descriptive sentence for the product, a type (category), a size, a brand name, color, price, or a weight of the product, and the like. Further, the product information may include, for example, a model number of the product, a seller, a manufacturer, an accessory, a sale target area, or a sale target person.

As illustrated in FIG. 3B, the product information generation system 100 displays the product information of the generated product image data as an initial value of each input form on a displayed product information input screen. In addition, the product information generation system 100 may display similar product image data of a setting source of the product information together with a textual message of "Information on this product was used!" as shown at a center of an upper part of FIG. 3B. It should be noted that, although an example in which one piece of similar product image data is used is shown in the example of FIGS. 3A-3C, a plurality of pieces of similar product image data may be used when the degree of similarity is determined to be equal to or higher than a predetermined degree of similarity, as described above.

With such a configuration, the product information generation system 100 can generate the product information represented by the product image data by comprehensively using a plurality of pieces of access information of the similar product image data, set the product information through automatic input of all pieces of product information or partial editing and input of the pieces of product information without the pieces of product information being manually input from the beginning, and provide a user-friendly commercial transaction service.

Further, the product information generation system 100 may display similar product media data serving as a candidate for a next setting source together with a textual message of "Select this product" in order to receive a designation input as to whether or not the user adopts (accepts and uses) access information of the similar product media data that is a setting source, with respect to the product information of the displayed product image data, as illustrated in FIGS. 3B and 3C. When the user designates and inputs a candidate for the next setting source through a tapping operation or the like, the product information generation system 100 may newly generate product information on the basis of the access information associated with the similar product media data serving as a candidate for the next setting source and replace an initial value of each input form with the newly generated product information on the displayed product information input screen, as illustrated in FIG. 3C. With such a configuration, it is possible to generate and set the product information according to each user.

Figure 2:
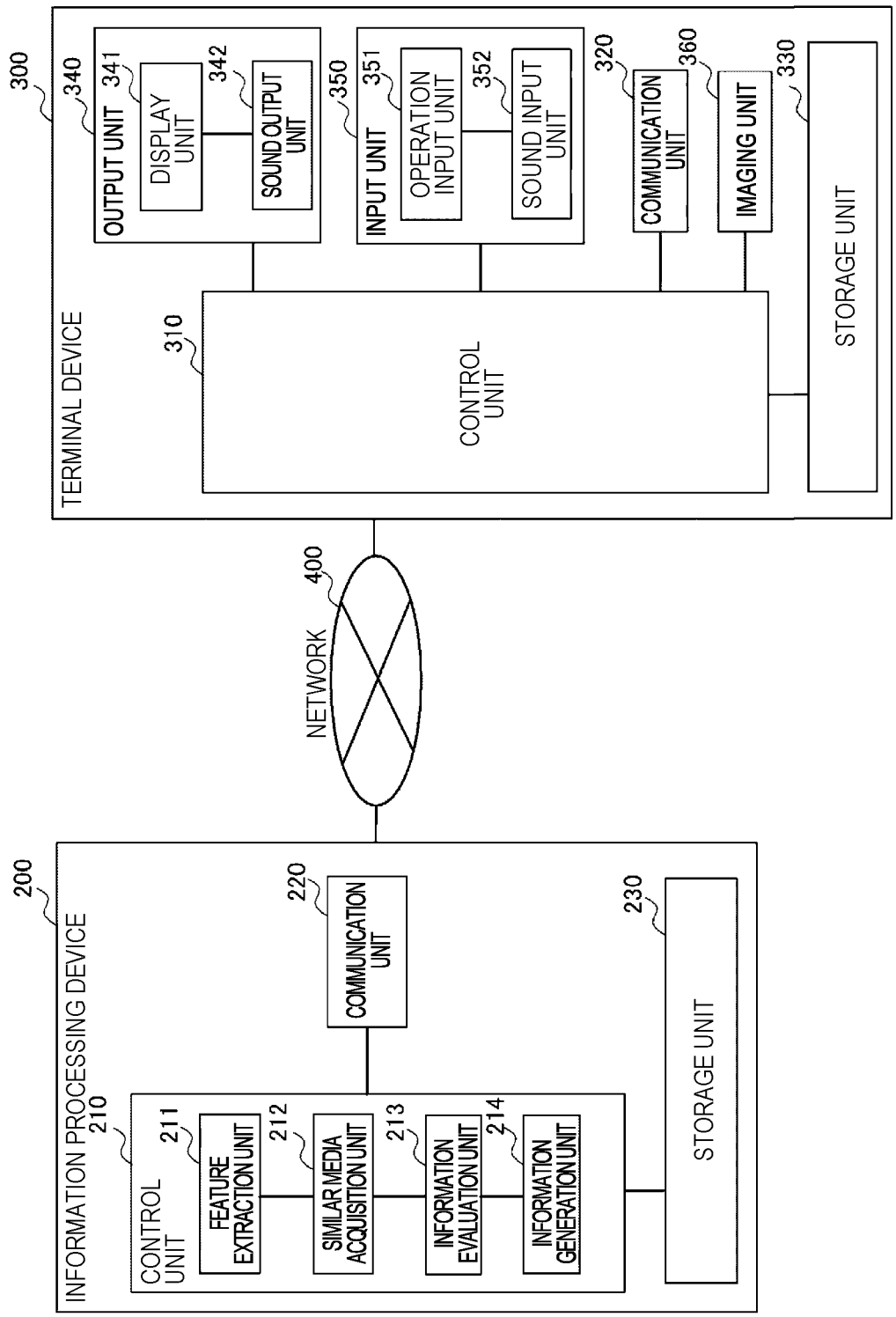
FIG. 2 is a diagram illustrating an example of a functional configuration of the product information generation system according to Embodiment 1 of the present invention.

(Functional configuration) FIG. 2 is a diagram illustrating an example of a functional configuration of the product information generation system 100 in Embodiment 1 of the present invention. As illustrated in FIG. 2, the product information generation system 100 includes an information processing device 200 and a terminal device 300. Specifically, the product information generation system 100 includes a storage unit 230 that stores access information used for access to product media data representing a product from a plurality of terminals in association with the product media data, a communication unit 220 that receives the product media data transmitted from one terminal, a feature extraction unit 211 that extracts a feature of the received product media data, a similar media acquisition unit 212 that acquires similar product media data of which a degree of similarity to the received product media data is equal to or higher than a predetermined degree of similarity and the access information associated with the similar product media data from the storage unit 230 on the basis of the extracted feature, and an information generation unit 214 that merges a plurality of pieces of access information of the acquired similar product media data to generate product information indicating the product of the received product media data. It should be noted that the "plurality of pieces of access information of the similar product media data" refers to a plurality of pieces of access information of one or more pieces of similar product media data, and indicates a state in which there may be one or a plurality of pieces of similar product media data or there are a plurality of pieces of access information associated with the pieces of similar product media data.

According to the configuration as described above, the product information generation system 100 can perform generation of product information based on an action of the user accessing the medium without using information that an owner or the user of the medium has arbitrarily assigned to the similar product media data. Further, when a plurality of users access one medium, the product information generation system 100 can use a route along which the users have reached the medium. Specifically, when most of search words of the user referring to a certain medium are "one piece" and "blue", it can be determined that the medium is highly likely to represent a blue one-piece product. Even when erroneous information is included in the product information incidental to the media data and the access information is associated with the erroneous product information, such access information can be disregarded according to the number of references or the like since the access information is rarely referred to by the user even when such media is searched for when a mistake is found at first glance.

Further, according to the configuration as described above, the product information generation system 100 merges the plurality of pieces of access information to generate the product information and uses the product information as information on the product indicated by the product media data. Thus, the user can adopt the information on the product comprehensively determined through merging of the plurality of pieces of access information while saving time and effort of manually inputting the product information, and it is possible to provide a user-friendly commercial transaction service.

(Information Processing Device 200)

The information processing device 200 includes a control unit 210, a communication unit 220, and a storage unit 230, as illustrated in FIG. 2. The product information generation system 100 includes an information processing device 200 and a terminal device 300. Specifically, the information processing device 200 includes a storage unit 230 that stores access information used for access to product media data representing a product from a plurality of terminals in association with the product media data, a communication unit 220 that receives the product media data transmitted from one terminal, a feature extraction unit 211 that extracts a feature of the received product media data, a similar media acquisition unit 212 that acquires similar product media data of which a degree of similarity to the received product media data is equal to or higher than a predetermined degree of similarity and the access information associated with the similar product media data from the storage unit 230 on the basis of the extracted feature, and an information generation unit 214 that merges a plurality of pieces of access information of the acquired similar product media data to generate product information indicating the product of the received product media data.

The control unit 210 includes the feature extraction unit 211, the similar media acquisition unit 212, an information evaluation unit 213, and an information generation unit 214, and is a processor having a function of controlling each functional unit of the information processing device 200.

The control unit 210, for example, may refer to, update, or delete various types of information such as the media data and the product information stored in the storage unit 230 on the basis of a processing request from each functional unit of the terminal device 300 or the information processing device 200 and generate output information for outputting a processing result on an output unit 340 of the terminal device 300. In this case, the generated output information is transmitted to the terminal device 300 via the communication unit 220 and the network 400.

The feature extraction unit 211 has a function of extracting features of various types of data and various types of information stored in the storage unit 230. Specifically, the feature extraction unit 211 extracts a feature of the product media data transmitted from the terminal device 300 and received by the communication unit 220.

Specifically, the feature extraction unit 211 calculates a feature quantity from the product media data. For example, the feature extraction unit 211 may calculate the feature quantity of the product media data using machine learning (depth learning (for example, convolution neural network (hereinafter referred to as "CNN"))) and extract the feature.

In addition, the feature extraction unit 211, more specifically, may construct a similar media determination model (a learning device) for pattern recognition by receiving, as learning data, at least one feature quantity such as the product media data in a predetermined period of time, the access information associated with the product media data, and data indicating whether or the access information has been adopted for generation of the product information, as an example of machine learning. The feature extraction unit 211 stores the constructed similar media determination model in the storage unit 230. The feature extraction unit 211 may extract the feature quantity using the constructed (learned) similar media determination model. Here, the "predetermined period of time" may be set to a threshold value for a period of time in which feedback information is accumulated in a storage such as the storage unit 230 as the learning data. The threshold value may be appropriately set according to, for example, a capacity or a configuration of the storage.

More specifically, in a method using depth learning, the feature extraction unit 211 may construct a multilayered neural network (a hierarchical neural network), receive information on an image captured by a user using an error back-propagation method, perform weighting in an input layer and an intermediate layer (including two or more intermediate layers), and perform output in an output layer. Further, the feature extraction unit 211 may update and learn the weighting in each layer on the basis of an error between a teacher signal such as the feature quantity of the accumulated product media data, the product information of the product media data, and the access information associated with the product media data, which are teacher data, and the output in the output layer, perform learning, and construct a similar media determination model as a pattern recognition model.

Further, as an example of the machine learning, the feature extraction unit 211 may further construct a similar media determination model by receiving, as learning data, input information of a designation input as to whether or not the access information of the similar product media data determined using the similar media determination model received by the input unit 350 is adopted. According to such a configuration, since the evaluation from the user can be fed back and the similar media determination model can be caused to perform learning, it is possible to efficiently achieve the learning and more reliably perform a determination process according to the similar media determination model.

The feature extraction unit 211 may use, for example, an image feature quantity such as histograms of oriented gradients (HOG), scale-invariant feature transform (SHIFT), or speeded up robust features (SURF), other than a feature quantity extracted by depth learning when the product media data is image data or moving image data, as another example. Further, the feature extraction unit 211 may perform feature quantity extraction based on frequency characteristics in sound data, as another example.

Further, the feature extraction unit 211 may compress dimensions of the obtained feature quantity of the media data for reduction in calculation costs in the subsequent similar media acquisition unit 212 and reduction in a storage capacity. Specifically, the feature extraction unit 211 may compress the feature quantity from thousands of dimensions to tens of dimensions through principal component analysis or the like.

The similar media acquisition unit 212 has a function of acquiring one or more pieces of product media data similar to product media data that is a target (hereinafter referred to as "similar product media data") from the media data stored in the storage unit 230 or the like. Specifically, the similar media acquisition unit 212 acquires similar product media data of which a degree of similarity to the received product media data is equal to or higher than a predetermined degree of similarity, and the access information associated with the similar product media data from the storage unit 230 on the basis of the feature extracted by the feature extraction unit 211. It should be noted that the similar media acquisition unit 212 may transfer only the access information as a parameter (an argument) of a subsequent merging process and a subsequent product information generation process in the information generation unit 214, with respect to the acquired similar product media data and the access information associated with the similar product media data.

It should be noted that, for transmission of various types of information and various types of data between the functional units, information or data itself may be transmitted and received, or only a position or an identifier of the information or the data stored in the storage unit 230 or the like may be transmitted and received.

Here, the "access information" refers to information used for access from the plurality of terminals. Specifically, the access information includes, for example, (1) search log information indicating a search history for accessing the product media data in the Internet or an application, (2) page transition log information indicating a transition history (including a transition history in units of screens) of a page according to a terminal operation of the terminal device 300 or the like regarding the product media data, and (3) access operation log information indicating an operation history of access to a screen component for accessing the product media data.

Further, the similar media acquisition unit 212 may determine the similar product media data of which a degree of similarity with the product media data is equal to or higher than a predetermined degree of similarity on the basis of the feature quantity of the product media data using the similar media determination model stored in the storage unit 230 or the like, and acquire the similar product media data.

The information evaluation unit 213 has a function of evaluating various types of data and various types of information. Specifically, the information evaluation unit 213 may evaluate a generation priority at the time of generation of the product information of the product media data with respect to the access information associated with the product media data on the basis of the page transition log information.

Here, the "generation priority" refers to a priority at the time of generation of the product information among the plurality of pieces of access information associated with the product media data. Any value may be used as the generation priority as long as a degree is indicated, and a gradation (for example, five-point scale or three-level evaluation), a percentage, or the like may be appropriately used.

More specifically, as one example, when a history of returning to a page before transition more than a predetermined number is shown in the page transition log information, the information evaluation unit 213 may determine that a likelihood of the user returning to the page before transition is high since the product media data does not correspond to a desired product and evaluate the generation priority at the time of generation of the product information of the product media data to be lower than the standard value.

More specifically, as another example, when a history of transition to a purchase page for purchasing a target product more than a predetermined number is shown in the page transition log information, the information evaluation unit 213 may determine that a likelihood of the user moving to the purchase page is high since the product is the desired product and evaluate the generation priority at the time of generation of the product information of the product media data to be higher than the standard value.

Further, the information evaluation unit 213 may evaluate a degree of purchase contribution indicating a degree of contribution to purchase of a product of access information associated with the product media data of which a degree of correlation with the purchase history information is equal to or higher than a predetermined degree of correlation on the basis of a weight value of the purchase history information. Here, the "predetermined degree of correlation" may be set to a threshold value for performing a determination as to whether correlation between the purchase history information and the product media data is high or low.

Here, the "purchase history information" is information indicating a purchase history of a product represented in the product media data. Specifically, the purchase history information includes a date and time of purchase, product information (for example, a product name or a size) of the purchased product, user name (a user identifier) purchasing the product, and the like. Further, the "weight value of the purchase history information" is a value weighted according to whether or not the user has actually purchased the product as a result of the user accessing the product media data.

Here, the "degree of purchase contribution" is a degree of contribution of each piece of access information to product purchase. In other words, the degree of purchase contribution refers to an expected value indicating how much each piece of access information can contribute to the generation of the product information that leads to the purchase of the product. As one example, the degree of purchase contribution may be a degree of correlation between the purchase history information and each piece of access information. As another example, the degree of purchase contribution may be a determination coefficient obtained by using regression analysis or the like by defining an item (for example, the number of searches or the number of taps) included in each piece of access information as an independent variable, and defining the number of times each piece of access information is adopted in generating the product information or the number of times a product has been purchased upon adoption and setting of corresponding generated product information as a dependent variable.

The information generation unit 214 has a function of generating various types of information. Specifically, the information generation unit 214 merges the plurality of pieces of access information of the acquired similar product media data to generate product information indicating the product of the product media data.

Figure 4:
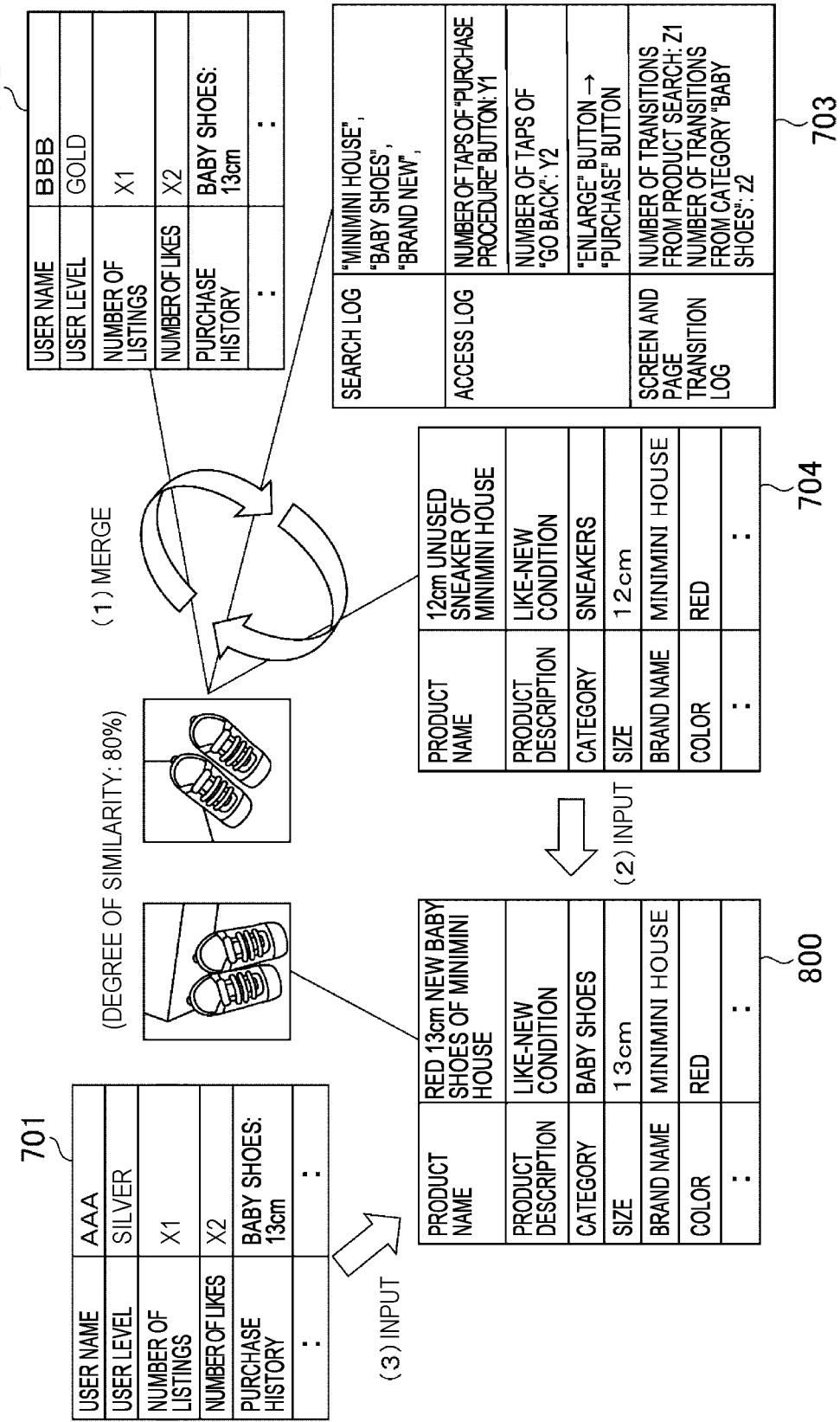
FIG. 4 is a diagram illustrating an overview of the product information generation system according to Embodiment 1 of the present invention.

A merging process of the information generation unit 214 will be described herein with reference to FIG. 4. FIG. 4 is a diagram illustrating an overview of the product information generation system 100 according to Embodiment 1 of the present invention. Here, the "merging process" generally refers to a process of integrating, for example, fusion, merging, amalgamating, mixing, or combining a plurality of pieces of access information or product information. Specifically, the merging process refers to a process of combining a plurality of pieces of access information or product information according to a predetermined rule (for example, simple/internal/external combination) for a plurality of files and data to generate one piece of product information. In the merging process of the product information, since the product media data itself such as product image data is not used and information incidental to the product media data is used, the product information can be generated without using an advanced analysis technology for media data. In the example of FIG. 4, on the left side of product image data of two shoes at an approximate center of FIG. 4, product information 800 of the product media data and personal information 701 of the user are associated with each other as the product media data transmitted from the terminal device 300 by the user. On the other hand, on the right side, personal information 702 of a user purchasing the product of the similar product media data, access information 703 of the similar product media data, and product information 704 of the similar product media data are associated with each other as similar product media data with the degree of similarity of 80%.

Here, the "personal information" is information related to an individual of a user. The personal information includes, for example, a name of a user, a grade of the user, the number of times of past exhibition, the number of times of high evaluation such as the number of times of "Like", a purchase history, an exhibition history, an address, and a telephone number.

Using (1) search log information (for example, a search keyword, the number of times of search (reference), or search date and time), (2) access operation log information (for example, the number of times of designation (number of taps) of screen component (for example, a button), or an order of transition), (3) page transition log information (for example, screens before and after transition of a target product display screen, and display history information of a page) as the access information 703 used for access from the terminal device 300 as illustrated in FIG. 4, the information generation unit 214 may merge these various types of information, that is, the same types of information (for example, the information (1) and the information (1)) together or may merge the different types of information (for example, the information (1) and the information (3)) together. Further, although one similar product is shown in the example of FIG. 4, the information generation unit 214 may merge the access information 703 of a plurality of pieces of similar product media data of which the degree of similarity is equal to or higher than a predetermined degree of similarity.

The information generation unit 214 may merge the search keywords indicated in the search log information to generate product information of the product media data, as an example of the merging process. The information generation unit 214, for example, may extract higher-level search keywords in a descending order of a search frequency (the number of searches in a predetermined period of time) from the search log information associated with the product media data to integrate the search keywords. When a numerical value in parentheses is set as the search frequency as illustrated in FIG. 4, the information generation unit 214 may extract search keywords such as "baby shoes" and "product" which are at higher positions in a descending order of the search frequency (a descending order of the numerical value in the parentheses) and input the search keywords to the "product name" or the "category" of the product information 800 of the product media data to generate the product information 800. According to such a configuration, since product information can be generated on the basis of an action regarding product search of a plurality of users, it is possible to perform a comprehensive and quantitative determination to generate more reliable product information.

The information generation unit 214 may extract higher-level categories (for example, baby shoes>first shoes>sneakers) in a descending order of a designation frequency and integrate the categories, as another example of the merging process.

In addition, the information generation unit 214 may prioritize the access information with a high generation priority to generate the product information of the product media data, as another example of the merging process. The information generation unit 214, for example, may evaluate a generation priority at the time of generation of the product information of the product media data with respect to the search keywords "baby shoes" and "new product" in the search log information on the basis of "the number of tapping of a "purchase procedure" button: y1" in the page transition log information of the access information 703, set the priority to be high so that the access information is prioritized over access information of another user when y1 is equal to or equal to, for example, a predetermined number of times, and input the keywords to the "product name" or "category" of the product information 800 of the product media data, as illustrated in FIG. 4. According to such a configuration, it is possible to evaluate the access information such as the search log information quantitatively and uniformly on the basis of an action of the user regarding the page transition such that the product information can be more reliable. Here, the predetermined number of times may be set to a threshold value (for example, "1") for determining whether or not tapping has been performed for proceeding to a purchase procedure with respect to y1 times.

The information generation unit 214 may merge the generated product information and the product information of the similar product media data acquired by the similar media acquisition unit 212 together and update the product information, as an example of the merging process.
For example, as illustrated in FIG. 4, the information generation unit 214 compares each item such as the product name indicated in the product information 704 of the similar product media data with the product information generated from the access information associated with the similar product media data, and the information generation unit 214 maintains the product information when the product information match, and update the product information with the product information 704 of the similar product media data through overwriting when the product information do not match. Further, a reverse order may also be used. For example, when the category generated from the access information is "baby shoes" and the category of the product information 704 is "sneakers", the category of the product information 800 of the product media data may be updated with "sneakers" through overwriting. According to such a configuration, it is possible to comprehensively determine not only the access information of the similar product media data but also the product information of the similar product media data and generate more reliable product information.

Further, the information generation unit 214 may prioritize the access information of the similar product media data having a high degree of purchase contribution and generate the product information of the product media data, as another example of the merging process. For example, when there is a record of purchasing "baby shoes with 13 cm" as a purchase history of the user in the personal information 702 of the user, the information generation unit 214 may weight the purchase history information, and the information evaluation unit 213 may highly evaluate the degree of purchase contribution so that the search keyword "baby shoes" in the search log information having correlation equal to or higher than a predetermined degree of correlation with the purchase history information is prioritized over other search log information and input the search keyword to the product information 800, as illustrated in FIG. 4. According to such a configuration, since the product information can be generated by prioritizing the access information actually contributing to the purchase of the product, it is possible to more effectively generate the product information.

Further, as another example of the merging process, the information generation unit 214 may set the accessed category indicated in the access history of the similar product media data, in the product information of the product media data on the basis of the access operation log information. For example, when a link is added to a category in the product information of the similar product media data and is tapped, the information generation unit 214 may set the tapped category as a category of the product information when the information generation unit 214 is implemented to be able to search the product regarding the category. According to such a configuration, it is possible to set the product information on the basis of an action of the user selecting a desired category with respect to the product of the similar product media data, and thus to more effectively set the product information.

Further, as another example of the merging process, the information generation unit 214 may receive information that is difficult to discriminate even if the degree of similarity between the pieces of product media data in the product information is high, for example, from other information such as the personal information 701 of the user. For example, the information generation unit 214 may receive a size of the product that is difficult to discriminate from the image data of the product from an exhibition history of the personal information 701 of the user, not from the access information or the product information associated with the similar product media data, and generate product information. According to such a configuration, since products can be ascertained in various ways, it is possible to generate more reliable product information.

As another example of the merging process, the information generation unit 214 may integrate prices of the product information of a plurality of pieces of similar product media data. For this integration, for example, the price may be integrated by calculating and adopting an average value of prices of a plurality of pieces of product information.

The communication unit 220 has a function of executing communication with the terminal device 300 or another information processing device 200 via the network 400 under the control of the control unit 210. The communication may be wired communication or wireless communication, and any communication protocol may be used as long as mutual communication can be executed. Specifically, the communication unit 220 may transmit the information on the similar product media data or the generated product information to the terminal device 300 or receive the product media data from the terminal device 300.

The storage unit 230 has a function of storing various programs, data, parameters, and the like necessary when the information processing device 200 performs calculation and processing under the control of the control unit 210. Specifically, the storage unit 230 stores, for example, the product media data, the access information associated with the product media data, the product information, the purchase history information (including a weight value according to the purchase history information), the output information, the input information, the similar media determination model, and personal information. Specifically, the storage unit 230 may use a database system or may use a file system. Further, the storage unit 230 may include a main storage device including a ROM and a RAM, an auxiliary storage device including a nonvolatile memory or the like, and various storage media such as a hard disk drive (HDD), a solid state drive (SSD), and a flash memory.

(Terminal Device 300)

The terminal device 300 includes a control unit 310, a communication unit 320, a storage unit 330, an output unit 340, an input unit 350, and an imaging unit 360, as illustrated in FIG. 2.

The control unit 310 is a processor having a function of controlling each functional unit of the terminal device 300.

The storage unit 330 has a function of storing various programs, data, parameters, and the like necessary when the terminal device 300 operates, under the control of the control unit 310. Specifically, the storage unit 330 stores, for example, the product media data, the access information associated with the product media data, the product information, the purchase history information (including a weight value according to the purchase history information), the output information (including the generated product information or the like), the input information (including, for example, information obtained by receiving a designation input as to whether or not the product information is adopted), and the similar media determination model. Specifically, the storage unit 330 includes a main storage device including a ROM and a RAM, an auxiliary storage device including a nonvolatile memory or the like, and various storage media such as an HDD, an SSD, or a flash memory.

The output unit 340 includes a display unit 341 and a sound output unit 342, and has a function of outputting various types of information to the terminal device 300 under the control of the control unit 310. Specifically, the output unit 340 outputs product media data and product information of the product media data.

The display unit 341 has a function of outputting various types of information such as imaging guide information. Specifically, for example, a liquid crystal display (LCD) display, a light emitting diode (LED) display, an organic light emitting diode (OLED) display, or the like may be used. The display unit 341 has a function of displaying, for example, product information of the product media data transmitted from the information processing device 200 via the network 400 under the control of the control unit 310. A display screen of the display unit 341 (including a screen displayed on a finder screen of a camera or the like of the imaging unit 360) may be generated, for example, in a general data format that can be displayed on the screen of the terminal device 300, such as a markup language such as a hypertext markup language (HTML), bitmap data, or image data subjected to a compression process.

The sound output unit 342 has a function of outputting sound under the control of the control unit 310. Specifically, the sound output unit 342, for example, may be realized by a built-in speaker to directly output sound or may be connected to a headphone or an earphone to output a sound signal to an external medium using a cable or wirelessly.

The input unit 350 includes an operation input unit 351 and a sound input unit 352, and has a function of receiving an input of various types of information to the terminal device 300 under the control of the control unit 310. The input unit 350 generates input information indicating received input content and transfers the input information to each functional unit under the control of the control unit 310. Specifically, the input unit 350 may receive a designation input as to whether or not the user adopts the access information of the similar product media data that is a setting source, with respect to the output product information of the media data.

The operation input unit 351 has a function of receiving an operation input from the user under the control of the control unit 310. Specifically, the operation input unit 351 is realized by soft keys or hard keys of a touch panel or the like.

Specifically, the operation input unit 351, for example, may receive a selection input for category information or receive an input of an imaging execution operation to the imaging unit 360 under the control of the control unit 310. Specifically, the operation input unit 351 may display the product information of the similar product media data serving as a candidate for a setting source of various input forms on the display unit 341 in a drop-down list and receive an input according to selection of the list or the like, or may receive a designation input according to a tapping operation for corresponding product media data displayed on the display unit 341.

The sound input unit 352 has a function of receiving sound from the user under the control of the control unit 310. Specifically, the sound input unit 352 is realized by, for example, a microphone attached to the terminal device 300. Specifically, the sound input unit 352, for example, may receive a selection input for a category of the product through sound or may receive an input of an imaging execution operation to the imaging unit 360 through sound under the control of the control unit 310.

The imaging unit 360 has a function of imaging, for example, a product that is an exhibition target from a lens included in the terminal device 300 under the control of the control unit 310. The imaging unit 360 may be, for example, a camera of a mobile terminal.

(Example of Data Flow)

Figure 5:
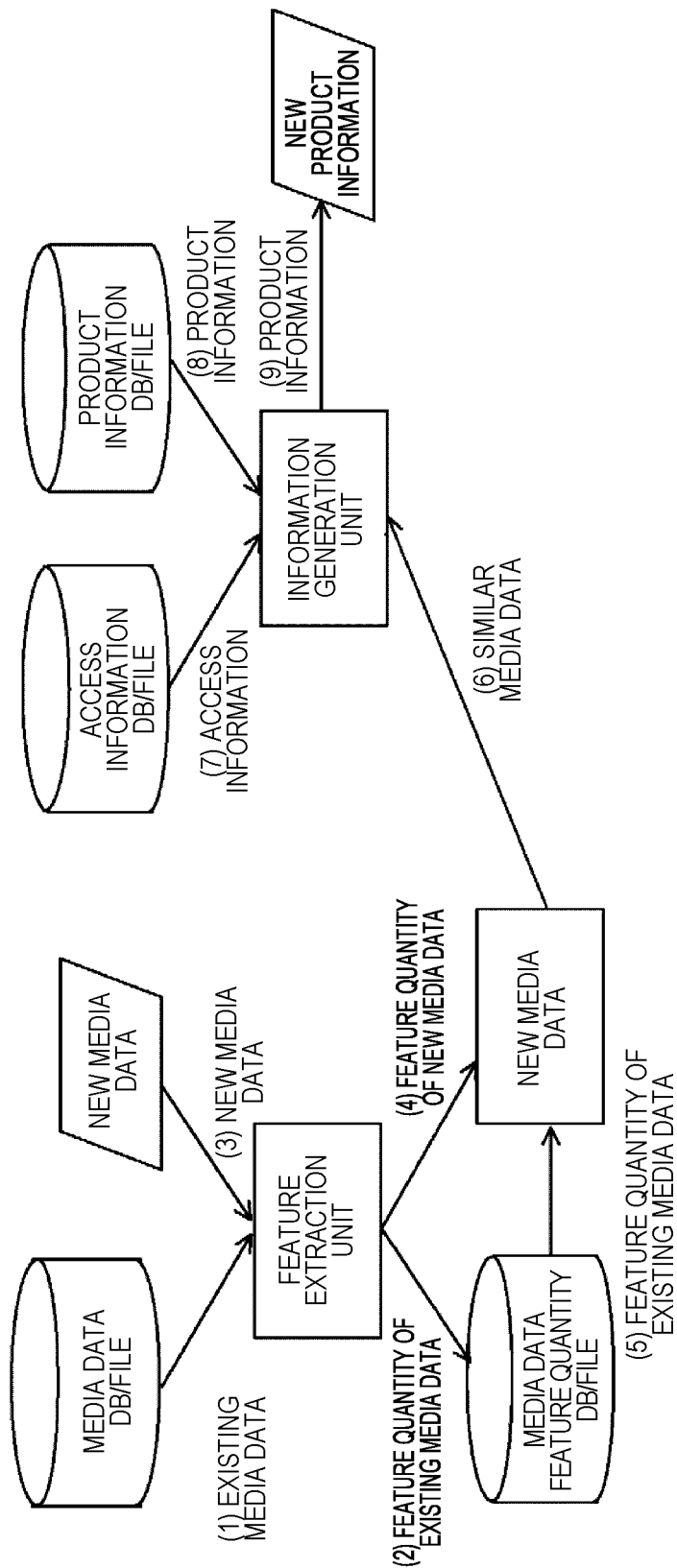
FIG. 5 is a diagram illustrating a data flow of the product information generation system according to Embodiment 1 of the present invention.

FIG. 5 is a data flow diagram illustrating an example of a data flow of the product information generation system 100 according to Embodiment 1 of the present invention.

As illustrated in FIG. 5, the feature extraction unit 211 receives (1) existing media data from a database system or a file system (hereinafter referred to as a "DB/File") serving as the storage unit 230 in which the media data is stored, and extracts the feature of the product media data. The feature extraction unit 211 outputs (2) the extracted feature quantity and stores the feature quantity in a media data feature quantity DB/File. The feature extraction unit 211 receives (3) new media data received by the communication unit 220 and extracts a feature of the media data. The feature extraction unit 211 outputs the extracted feature quantity. The similar media acquisition unit 212 receives (4) the feature quantity of the new media data and (5) the feature quantity of the existing media data, determines similar media data using the similarity determination model, and acquires an identifier of the similar media data. The similar media acquisition unit 212 outputs the acquired identifier of the similar media data to the information generation unit 214.

As illustrated in FIG. 5, the information generation unit 214 receives the identifier of the similar media data, searches the access information DB/File for (7) the access information associated with the similar media data with the identifier, and receives the access information. In addition, the information generation unit 214 searches the product information DB/File for (8) the product information associated with the similar media data with the identifier, and receives the product information. The information generation unit 214 merges the received access information and the received product information together to generate product information. The information generation unit 214 outputs the generated product information as product information of the new media data.

(Example of Operation)

Figure 6A:
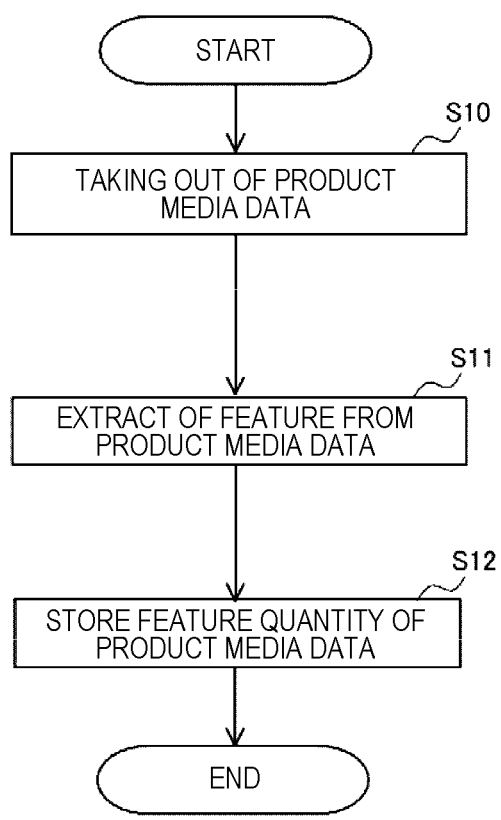
FIGS. 6A and 6B are diagrams illustrating an example of an operation of a product information generation system according to Embodiment 1 of the present invention.
Figure 6B:
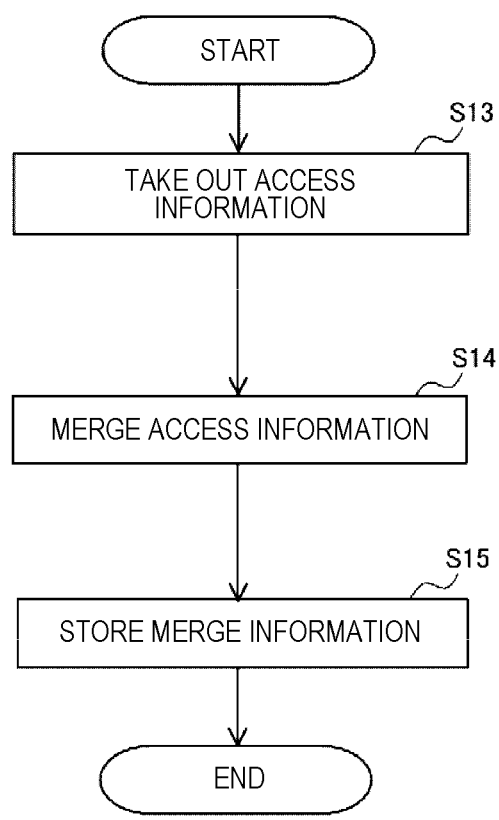
Figure 7:
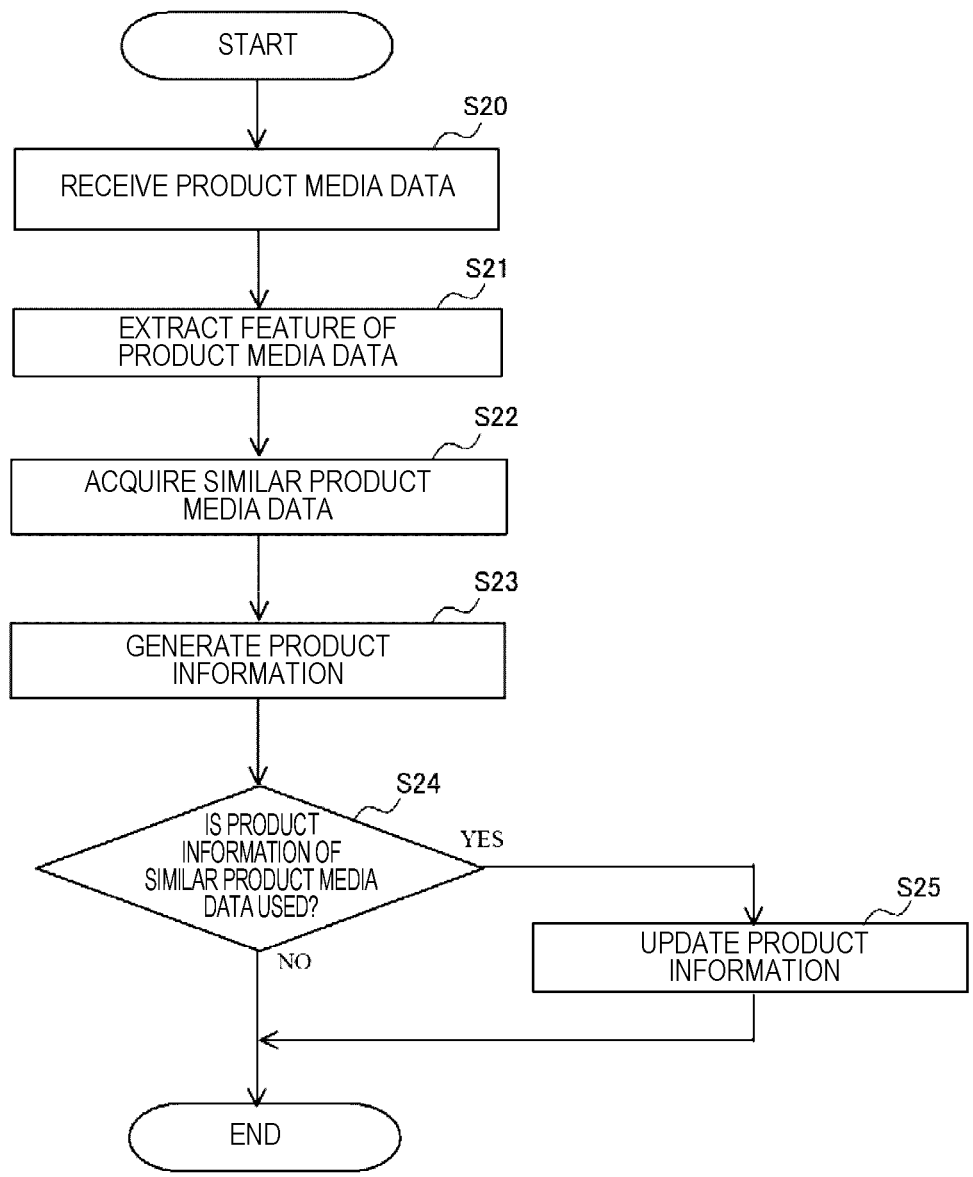
FIG. 7 is a diagram illustrating an example of an operation of a product information generation system according to Embodiment 1 of the present invention.
Figure 10:
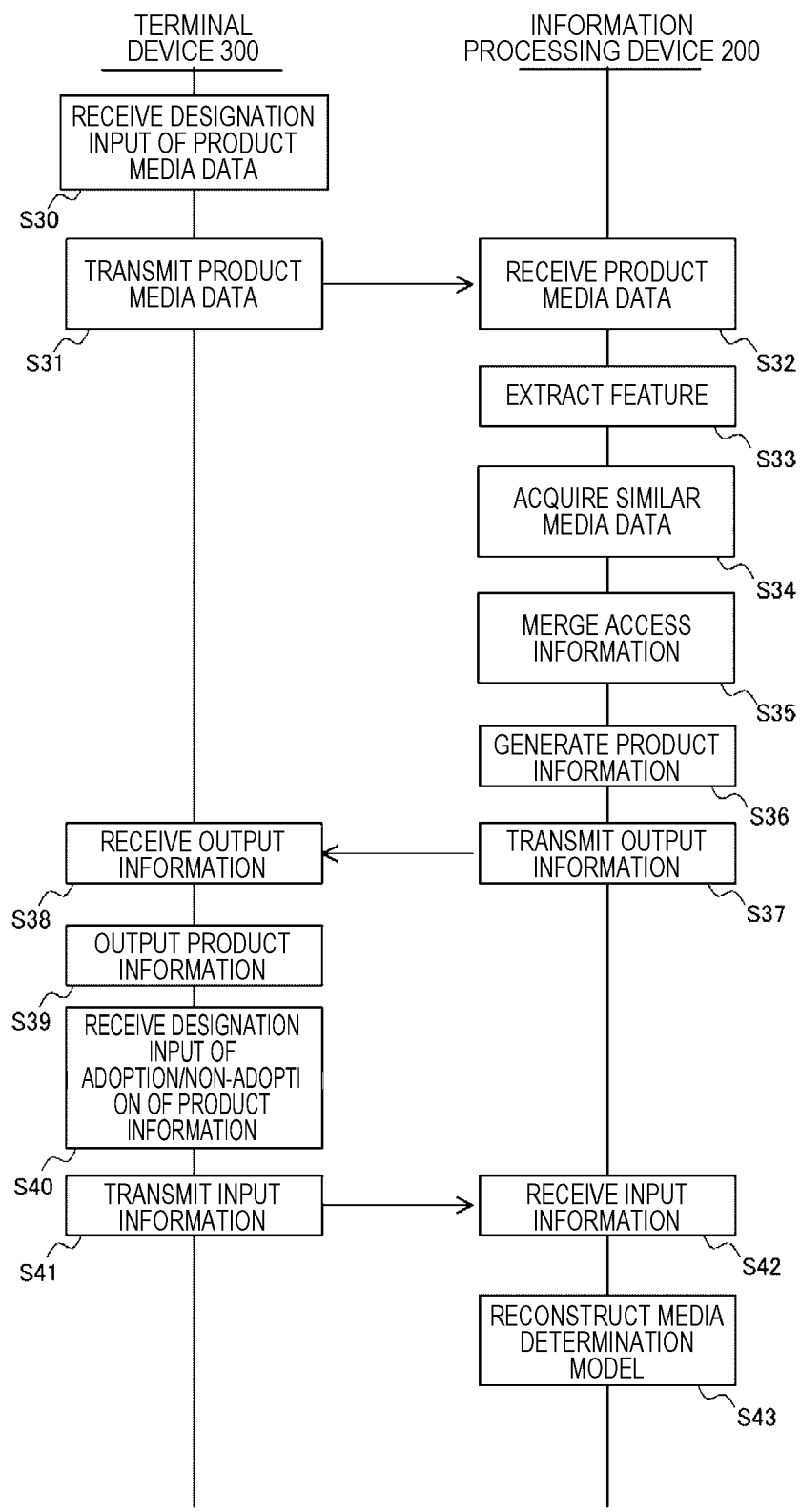
FIG. 10 is a diagram illustrating an example of an operation of a product information generation system according to Embodiment 1 of the present invention.

An example of an operation of the product information generation system 100 according to Embodiment 1 of the present invention will be described with reference to FIGS. 6A, 6B, 7, and 10. FIGS. 6A, 6B, and 7 are flowcharts showing an example of an operation of the product information generation system 100 according to Embodiment 1 of the present invention. FIG. 10 is a sequence diagram illustrating an example of an operation of the product information generation system 100 according to Embodiment 1 of the present invention.

FIGS. 6A and 6B are flowcharts showing an example of a process (pre-processing) in a stage prior to a product information generation process of the product information generation system 100.

As illustrated in FIG. 6A, the feature extraction unit 211 takes out the product media data from the storage unit 230 (S10). The feature extraction unit 211 extracts a feature from the product media data that has been taken out (S11). The feature extraction unit 211 stores an extracted feature quantity in the storage unit 230 (S12).

As illustrated in FIG. 6B, the information generation unit 214 takes out a plurality of pieces of access information associated with the product media data from the storage unit 230 (S13). The information generation unit 214 merges the plurality of pieces of extracted access information (S14). The information generation unit 214 stores merged information (merge information) in the storage unit 230 (S15).

FIG. 7 is a flowchart showing an example of the product information generation process of the product information generation system 100.

As illustrated in FIG. 7, the communication unit 220 receives product media data transmitted from one terminal device 300 (S20). The communication unit 220 transfers the received product media data to the feature extraction unit 211.

The feature extraction unit 211 extracts the feature of the transferred product media data (S21). The feature extraction unit 211 transfers an extracted feature quantity to the similar media acquisition unit 212.

The similar media acquisition unit 212 acquires similar product media data of which a degree of similarity with the received product media data is equal to or higher than a predetermined degree of similarity, and the merge information of the access information correlated with the similar product media data from the storage unit 230 on the basis of the transferred feature quantity (S22). The similar media acquisition unit 212 transfers the acquired similar product media data and the acquired merge information to the information generation unit 214. It should be noted that, as another example, the similar media acquisition unit 212 may acquire a plurality of pieces of access information associated with the similar product media data from the storage unit 230. However, in this example, it is assumed that the access information has already been merged in the preprocessing stage as illustrated in FIG. 6B, and the similar media acquisition unit 212 acquires the merge information.

The information generation unit 214 generates product information of the received product media data on the basis of the transferred merge information (S23). When the information generation unit 214 uses the product information of the transferred similar product media data (YES in S24), the information generation unit 214 merges the generated product information and the product information of the similar product media data together and updates the product information of the received product media data (S25).

FIG. 10 is a sequence diagram illustrating an example of the product information generation process of the product information generation system 100.

As illustrated in FIG. 10, the terminal device 300 receives a designation input of the product media data from the user (S30). The terminal device 300, specifically, may receive the designation input by receiving uploading of product media data such as image data representing the product to a product sales page or the like displayed on the display unit 341 or may receive the designation input by receiving pressing of a button with a text display such as "Input product information".

The terminal device 300 transmits the designated product media data to the information processing device 200 (S31).

The information processing device 200 receives the product media data transmitted from the terminal device 300 (S32).

The information processing device 200 extracts the feature of the received product media data (S33).

The information processing device 200 acquires similar product media data of which a degree of similarity to the received product media data is equal to or higher than a predetermined degree of similarity and the access information associated with the similar product media data from the storage unit 230 on the basis of the extracted feature (S34).

The information processing device 200 merges a plurality of pieces of access information of the acquired similar product media data to generate product information indicating the product of the received product media data (S35).

The information processing device 200 transmits output information including the generated product information to the terminal device 300 (S37). It should be noted that the information processing device 200 may also cause information on the similar product media data to be included in the output information.

The terminal device 300 receives the output information transmitted from the information processing device 200 (S38).

The terminal device 300 displays the product information included in the received output information (S39). Specifically, the terminal device 300 may display the received product information as an initial value in each input form on the product information input screen displayed on the terminal device 300.

The terminal device 300 receives a designation input such as whether or not the displayed product information is to be adopted from the user (S40). The terminal device 300 may receive, for example, (1) a designation as to whether or not an initial value displayed on each input form of the input screen is edited, and a degree of editing when the initial value is edited (a difference from the initial value), and (2) a designation as to whether or not the similar product used for the input form is adopted as illustrated in FIGS. 3B and 3C, to thereby receive a designation input as to whether or not the product information is adopted.

The terminal device 300 generates input information indicating such received input content and transmits the input information to the information processing device 200 (S41).

The information processing device 200 receives the transmitted input information (S42).

The information processing device 200 causes the received input information to be fed back as learning data of the media determination model and causes the media determination model to be reconstructed (machine learning) (S43).

It should be noted that any combinations of the above components and those obtained by converting presentations of the present invention among methods, device, systems, computer programs, data structures, recording media, or the like are also effective as aspects of the present invention.

Embodiment 2

Hereinafter, Embodiment 2 which is an embodiment of the present invention will be described with reference to the drawings. Embodiment 2 is an aspect in which feature extraction is performed on product media data such as an image captured in the terminal device 300 and sound recorded in the terminal device 300, extracted feature quantity or the like is transmitted to the information processing device 200, the extracted feature quantity or the like is received by the information processing device 200, similar product medium data stored in the storage unit 230 is acquired, generation of product information is performed, and transmission is performed in order to display the generated product information on the terminal device 300. The configuration in Embodiment 2 is a configuration in which a communication load can be reduced since it is not necessary for the product media data itself to be transmitted in communication between the information processing device 200 and the terminal device 300 and a feature quantity or the like extracted on the terminal device 300 may be transmitted. Hereinafter, only differences between Embodiment 2 and Embodiment 1 will be described below.

(Functional Configuration)

Figure 8:
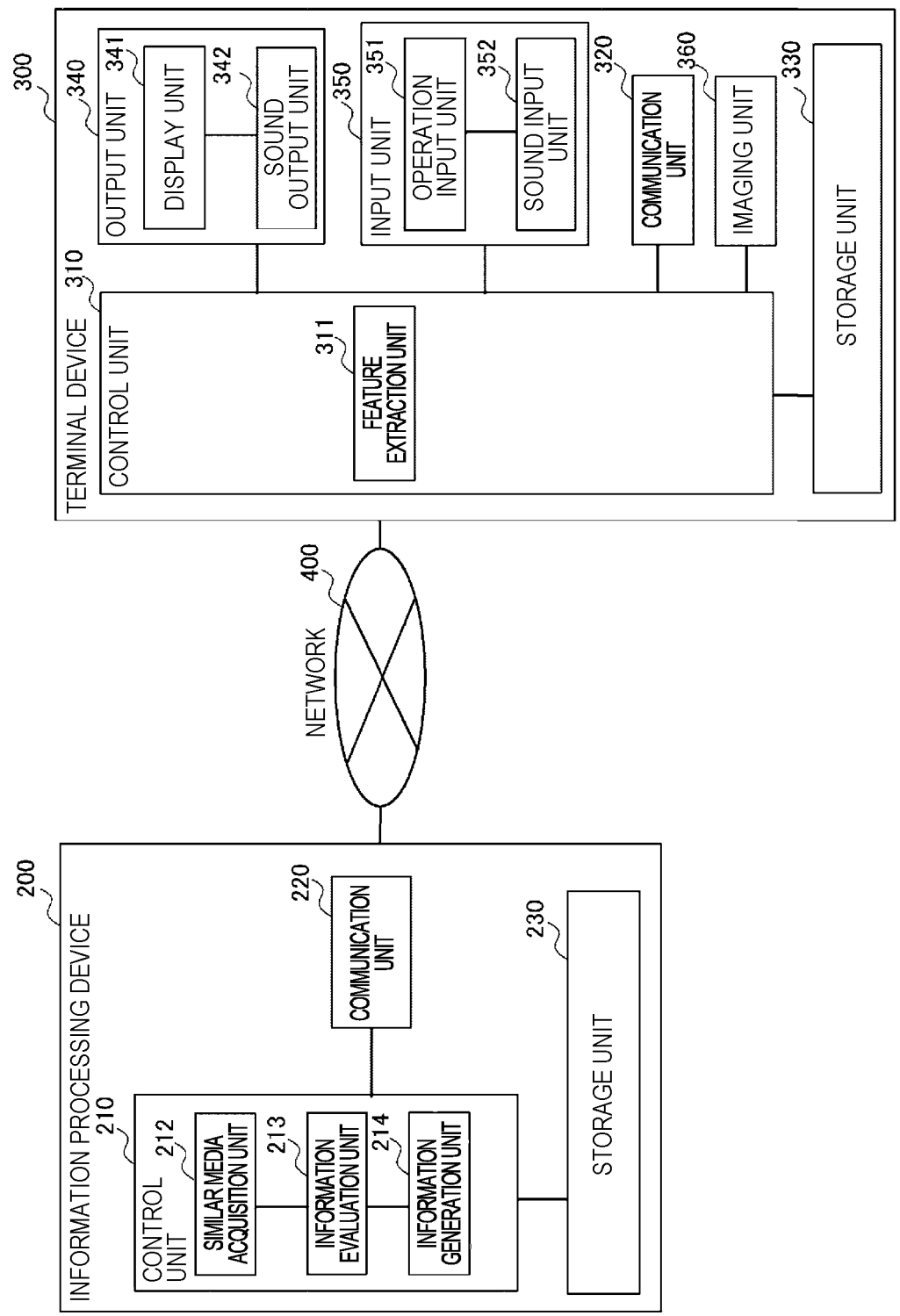
FIG. 8 is a diagram illustrating an example of a functional configuration of a product information generation system according to Embodiment 2 of the present invention.

FIG. 8 is a diagram illustrating an example of a functional configuration of a product information generation system 100 according to Embodiment 2 of the present invention. As illustrated in FIG. 8, the product information generation system 100 includes a terminal device 300 possessed by a user of an information processing device 200, and the information processing device 200 connected to the terminal device 300 via a network 400.

As illustrated in FIG. 8, the information processing device 200 includes a storage unit 230 that stores access information used for access to product media data representing a product from a plurality of terminal devices in association with the product media data, a communication unit 220 that receives feature quantity data extracted from the product media data from one terminal device, a similar media acquisition unit 212 that acquires similar product media data of which a degree of similarity to the product media data is equal to or higher than a predetermined degree of similarity and the access information associated with the similar product media data from the storage unit 230 on the basis of the extracted feature, and an information generation unit 214 that merges a plurality of pieces of access information of the acquired similar product media data to generate product information indicating the product of the received product media data.

Further, the terminal device 300 includes an input unit 350 that receives a designation input for the product media data, a feature extraction unit 311 that extracts a feature quantity of the designated product media data, and a communication unit 320 that transmits the extracted feature quantity to the information processing device, as illustrated in FIG. 8.

The terminal device 300 includes a control unit 310, a communication unit 320, a storage unit 330, an output unit 340, an input unit 350, and an imaging unit 360, as illustrated in FIG. 8. Functions of the respective functional units are the same as those in Embodiment 1 except for the control unit 310.

The control unit 310 includes a feature extraction unit 311. A function of the feature extraction unit 311 is the same as that of the feature extraction unit 211 of the server device 200 according to Embodiment 1.

In addition, a system configuration, an example of a screen, and an example of an operation according to Embodiment 2 of the present invention are the same as those in Embodiment 1.

Third Embodiment

Hereinafter, Embodiment 3 which is an embodiment of the present invention will be described with reference to the drawings. Embodiment 3 is an aspect in which processes from product extraction to generation of product information are performed on product media data such as an image captured by the terminal device 300 and sound recorded by the terminal device 300, and a display of the generated product information is performed. The configuration of Embodiment 3 is a configuration that can be realized by only the terminal device 300. Only differences between Embodiment 3 and Embodiment 1 will be described below.

(Functional Configuration)

Figure 9:
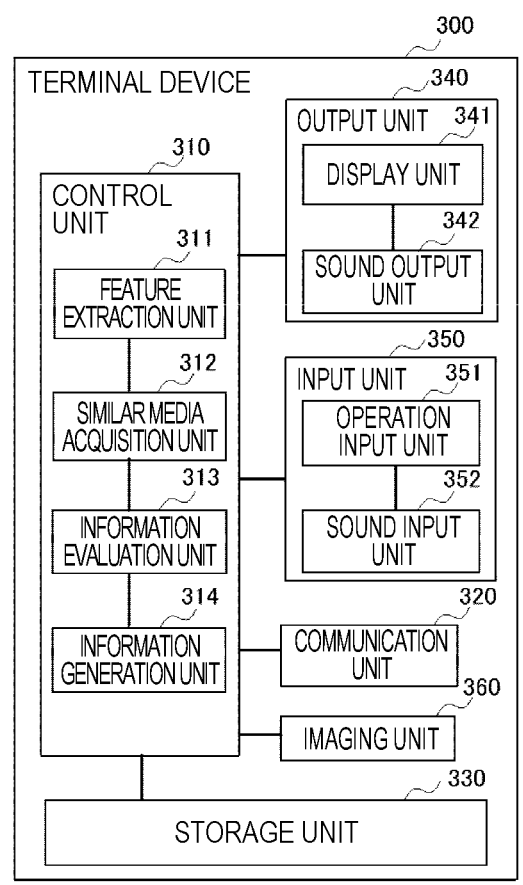
FIG. 9 is a diagram illustrating an example of a functional configuration of a product information generation system according to Embodiment 3 of the present invention.

FIG. 9 is a diagram illustrating an example of a functional configuration of a product information generation system 100 according to Embodiment 3 of the present invention. As illustrated in FIG. 9, the product information generation system 100 includes a terminal device 300 associated with a user of an information processing device 200.

As illustrated in FIG. 9, the terminal device 300 includes a storage unit 330 that stores access information used for access to product media data representing a product from a plurality of terminal devices in association with the product media data, an input unit 350 that receives a designation input for product media data in which generation of product information is to be performed, a feature extraction unit 311 that extracts a feature of the product media data designated by the input unit 350, a similar media acquisition unit 312 that acquires similar product media data of which a degree of similarity to the stored product media data is equal to or higher than a predetermined degree of similarity and the access information associated with the similar product media data from the storage unit 330 on the basis of the extracted feature, and an information generation unit 314 that merges a plurality of pieces of access information of the acquired similar product media data to generate product information indicating the product of the stored product media data.

The terminal device 300 includes a control unit 310, a communication unit 320, a storage unit 330, an output unit 340, an input unit 350, and an imaging unit 360, as illustrated in FIG. 9. Functions of the respective functional units are the same as those in Embodiment 1 except for the control unit 310 and the input unit 350.

The control unit 310 includes a feature extraction unit 311, a similar media acquisition unit 312, an information evaluation unit 313, and an information generation unit 314, and is a processor having a function of controlling each functional unit of the terminal device 300. The function of each functional unit is the same as each functional unit of the server device 200 according to Embodiment 1.

The input unit 350 includes an operation input unit 351 and a sound input unit 352, and has a function of receiving an input of various types of information in the terminal device 300 under the control of the control unit 310. Specifically, the input unit 350 may receive a designation input as to whether generation (setting) of product information is to be performed on output product media data.

In addition, a system configuration according to Embodiment 3 of the present invention is a configuration in which a plurality of terminal devices 300 are connected via a network 400. In addition, example of a screen and an example of an operation are the same as those in Embodiment 1.

Each functional unit of the information processing device 200 and the terminal device 300 may be realized by a logic circuit (hardware) or a dedicated circuit formed of, for example, an integrated circuit (an integrated circuit (IC) chip or a large scale integration (LSI)) or may be realized by software using a central processing unit (CPU) and a memory. In addition, each functional unit may be realized by one or a plurality of integrated circuits, or functions of the plurality of functional units may be realized by one integrated circuit. An LSI may be referred to as VLSI, Super LSI, Ultra LSI, or the like according to a difference in integration. It should be noted that the "circuit" may include a meaning as digital processing using a computer, that is, functional processing using software. Further, the circuit may be realized by a reconfigurable circuit (for example, field programmable gate array (FPGA)).

When the respective functional units of the information processing device 200 and the terminal device 300 are realized by software, the information processing device 200 and the terminal device 300 include a CPU that executes instructions of the product information generation program which is software realizing each of the functions, a read only memory (ROM) or a storage device (these are referred to as a "recording medium") in which the product information generation program and various types of data are recorded to be readable by the computer (or the CPU), or a random access memory (RAM) in which the product information generation program is developed. The object of the present invention is achieved by the computer (or the CPU) reading the product information generation program from the recording medium and executing the product information generation program. For the recording medium, a "non-transitory tangible medium" such as a tape, a disc, a card, a semiconductor memory, or a programmable logic circuit can be used. Further, the product information generation program may be supplied to the computer via any transfer medium (a communication network, a broadcast wave, or the like) capable of transferring the product information generation program. The present invention can also be realized in the form of a data signal embedded in a carrier wave in which the product information generation program is embodied by electronic transfer.

It should be noted that the product information generation program is implemented by using, for example, a script language such as ActionScript or JavaScript (registered trademark), an object-oriented programming language such as Objective-C or Java (registered trademark), or a markup language such as HTML5.

EXPLANATION OF REFERENCES

100 Product information generation system
200 Information processing device
210 Control unit
211 Feature extraction unit
212 Similar media acquisition unit
213 Information evaluation unit
214 Information generation unit
220 communication unit
230 Storage unit
300 Terminal device
310 Control unit
311 Feature extraction unit
312 Similar media acquisition unit
313 Information evaluation unit
314 Information generation unit
320 Communication unit
330 Storage unit
340 Output unit
341 Display unit
342 Sound output unit
350 Input unit
351 Operation input unit
352 Sound input unit
360 Imaging unit
400 Network

What is claimed is:

1. A product information generation system comprising:
a storage unit configured to store access information for access to product media data that describes one or more features representing a product, from a plurality of terminal devices in association with the product media data, wherein the product is a target of a listing for sale;
a communication unit configured to receive the product media data transmitted from one terminal device, in relation to the listing for sale;
a feature-extraction unit configured to extract an extracted feature of the received product media data;
a similar-media acquisition unit configured to acquire similar-product media data having a degree of similarity with the received product media data equal to or higher than a predetermined degree of similarity, wherein the access information is associated with the similar-product media data, and wherein the similar-media acquisition unit is further configured to acquire the access information associated with the similar-product media data acquired from the storage unit on the basis of the extracted feature; and
an information generation unit configured to merge a plurality of pieces of related information comprising the access information of the similar-product media data acquired and the similar-product media data, to generate first product information indicating the product corresponding to the product media data, wherein the first product information is associated with the listing for sale.

2. The product information generation system according to claim 1,
wherein the storage unit is further configured to store the first product information of the similar-product media data, and
wherein the information generation unit is further configured to merge the first product information with second product information corresponding to the similar-product media data together, to update the first product information.

3. The product information generation system according to claim 1,
wherein the access information comprises a search history corresponding to the product media data, and
wherein the information generation unit is further configured to merge search keywords indicated in the search log information to generate second product information corresponding to the product media data.

4. The product information generation system according to claim 1,
wherein the access information comprises a transition history of a page according to an operation of the terminal with respect to the product media data,
wherein the product information generation system further comprises an information evaluation unit configured to evaluate a generation priority at the time of generation of the product information of the product media data with respect to the access information on the basis of the transition history, and
the information generation unit is further configured to prioritize the access information that has a generation priority above a predetermined value, to generate second product information of the received product media data.

5. The product information generation system according to claim 1,
wherein the storage unit is further configured to store a purchase history of the product and a weight value for weighting according to the purchase history information,
wherein the product information generation system further comprises an information evaluation unit configured to evaluate a degree of purchase contribution, indicating contribution to purchase of the product corresponding to the access information, of which a degree of correlation with the purchase history has at least a predetermined degree of correlation on the basis of the weight value, and
wherein the information generation unit is further configured to prioritize the access information of the similar: product media data for which the degree of purchase contribution exceeds a predetermined threshold, to generate second product information of the received product media data.

6. The product information generation system according to claim 1,
wherein the storage unit stores a similar: media determination model for pattern recognition constructed by receiving a feature quantity of at least one of the product media data and the access information as learning data in a predetermined period of time,
wherein the similar media acquisition unit is further configured to determin the similar-product media data of which a degree of similarity with the product media data is equal to or higher than a predetermined degree of similarity on the basis of the feature quantity of the media data using the similar-media determination model, and acquires the similar: product media data,
wherein the product information generation system includes
an output unit that outputs the product media data and product information of the product media data, and
an input unit that receives a designation input as to whether or not a user has adopted access information of the similar-product media data that is a setting source with respect to the output product information of the media data; and
the feature-extraction unit further constructs the similar: media determination model by receiving information of the designation input as to whether the received access information is adopted as learning data.

7. A non-transitory computer-readable storage medium having instructions stored thereon that, when executed by at least one computer processor, cause the at least one computer processor to perform functions comprising:
a storage function of storing access information regarding access to product media data that includes one or more descriptive media from which features representing a product may be extracted, wherein the access to the product media data may be performed by at least one terminal device of a plurality of terminal devices, in association with the product media data, wherein the product is a target of a listing for sale;
a communication function of receiving the product media data transmitted from the at least one terminal device, in relation to the listing for sale;
a feature-extraction function of extracting an extracted feature of the received product media data;
a similar-media acquisition function of acquiring similar-product media data having a degree of similarity to the received product media data equal to or higher than a predetermined degree of similarity, wherein the access information is associated with the similar-product media data, and of acquiring the access information associated with the similar-product media data acquired from the storage unit on the basis of the extracted feature; and
an information generation function of merging a plurality of pieces of related information comprising the access information of the similar-product media data acquired and the similar-product media data, to generate first product information indicating the product corresponding to the product media data, wherein the first product information is associated with the listing for sale.

8. A product information generation method comprising:
storing, by a computer, access information regarding access to product media data that includes one or more descriptive media from which features representing a product may be extracted, wherein the access to the product media data may be performed by at least one terminal device of a plurality of terminal devices, in association with the product media data, wherein the product is a target of a listing for sale;
receiving, by a computer, the product media data transmitted from the at least one terminal device, in relation to the listing for sale;
extracting, by the computer, an extracted feature of the received product media data;
acquiring, by the computer, similar: product media data having a degree of similarity to the received product media data equal to or higher than a predetermined degree of similarity, wherein the access information is associated with the similar-product media data;
acquiring, by the computer, the access information associated with the similar: product media data from the storage unit on the basis of the extracted feature; and
merging, by the computer, a plurality of pieces of related information comprising the access information of the similar-product media data acquired and the similar-product media data, to generate first product information indicating the product corresponding to the product media data, wherein the first product information is associated with the listing for sale.

9. The product information generation method according to claim 8,
wherein the storing further comprises storing the first product information of the similar-product media data, and
wherein the merging further comprises merging the first product information with second product information corresponding to the similar-product media data together, to update the first product information.

10. The product information generation method according to claim 8,
wherein the access information comprises a search history corresponding to the product media data, and
wherein the merging further comprises merging search keywords indicated in the search log information to generate second product information corresponding to the product media data.

11. The product information generation method according to claim 8,
wherein the access information comprises a transition history of a page according to an operation of the terminal with respect to the product media data,
wherein the product information generation method further comprises evaluating a generation priority at the time of generation of the product information of the product media data with respect to the access information on the basis of the transition history, and the merging further comprises prioritizing the access information that has a generation priority above a predetermined value, to generate second product information of the received product media data.

12. The product information generation method according to claim 8, wherein the storing further comprises storing a purchase history of the product and a weight value for weighting according to the purchase history information, wherein the product information generation method further comprises evaluating a degree of purchase contribution indicating a degree of contribution a to purchase of the product corresponding to the access information of which a degree of correlation with the purchase history has at least a predetermined degree of correlation on the basis of the weight value, and wherein the merging further comprises prioritizing the access information of the similar-product media data for which the degree of purchase contribution exceeds a predetermined threshold, to generate second product information of the received product media data.

13. The non-transitory computer-readable storage medium according to claim 7, wherein the storage function is further configured to store the first product information of the similar-product media data, and wherein the information generation function is further configured to merge the first product information with second product information corresponding to the similar-product media data together, to update the first product information.

14. The non-transitory computer-readable storage medium according to claim 7, wherein the access information comprises a search history corresponding to the product media data, and wherein the information generation function is further configured to merge search keywords indicated in the search log information to generate second product information corresponding to the product media data.

15. The non-transitory computer-readable storage medium according to claim 7, wherein the access information comprises a transition history of a page according to an operation of the terminal with respect to the product media data, wherein the product information generation method further comprises evaluating a generation priority at the time of generation of the product information of the product media data with respect to the access information on the basis of the transition history, and the information generation function is further configured to prioritize the access information that has a generation priority above a predetermined value, to generate second product information of the received product media data.

16. The non-transitory computer-readable storage medium according to claim 7, wherein the storage function is further configured to store a purchase history of the product and a weight value for weighting according to the purchase history information, wherein the product information generation system further comprises an information evaluation function of evaluating a degree of purchase contribution indicating a degree of contribution a to purchase of the product corresponding to the access information of which a degree of correlation with the purchase history has at least a predetermined degree of correlation on the basis of the weight value, and wherein the information generation function is further configured to prioritize the access information of the similar-product media data for which the degree of purchase contribution exceeds a predetermined threshold, to generate second product information of the received product media data.

17. The non-transitory computer-readable storage medium according to claim 16, wherein the degree of contribution comprises a determination coefficient that is obtained based at least in part on a first quantity and a second quantity, wherein the first quantity quantifies the access information, and wherein the second quantity quantifies a number of purchases related to the access information.

18. The non-transitory computer-readable storage medium according to claim 17, wherein the first quantity is assigned to an independent variable of a regression analysis, and wherein the second quantity is assigned to a dependent variable of the regression analysis.

19. The product information generation system according to claim 5, wherein the degree of contribution comprises a determination coefficient that is obtained based at least in part on a first quantity and a second quantity, wherein the first quantity quantifies the access information, and wherein the second quantity quantifies a number of purchases related to the access information.

20. The product information generation system according to claim 19, wherein the first quantity is assigned to an independent variable of a regression analysis, and wherein the second quantity is assigned to a dependent variable of the regression analysis.

\* \* \* \* \*